Patented Mar. 10, 1953

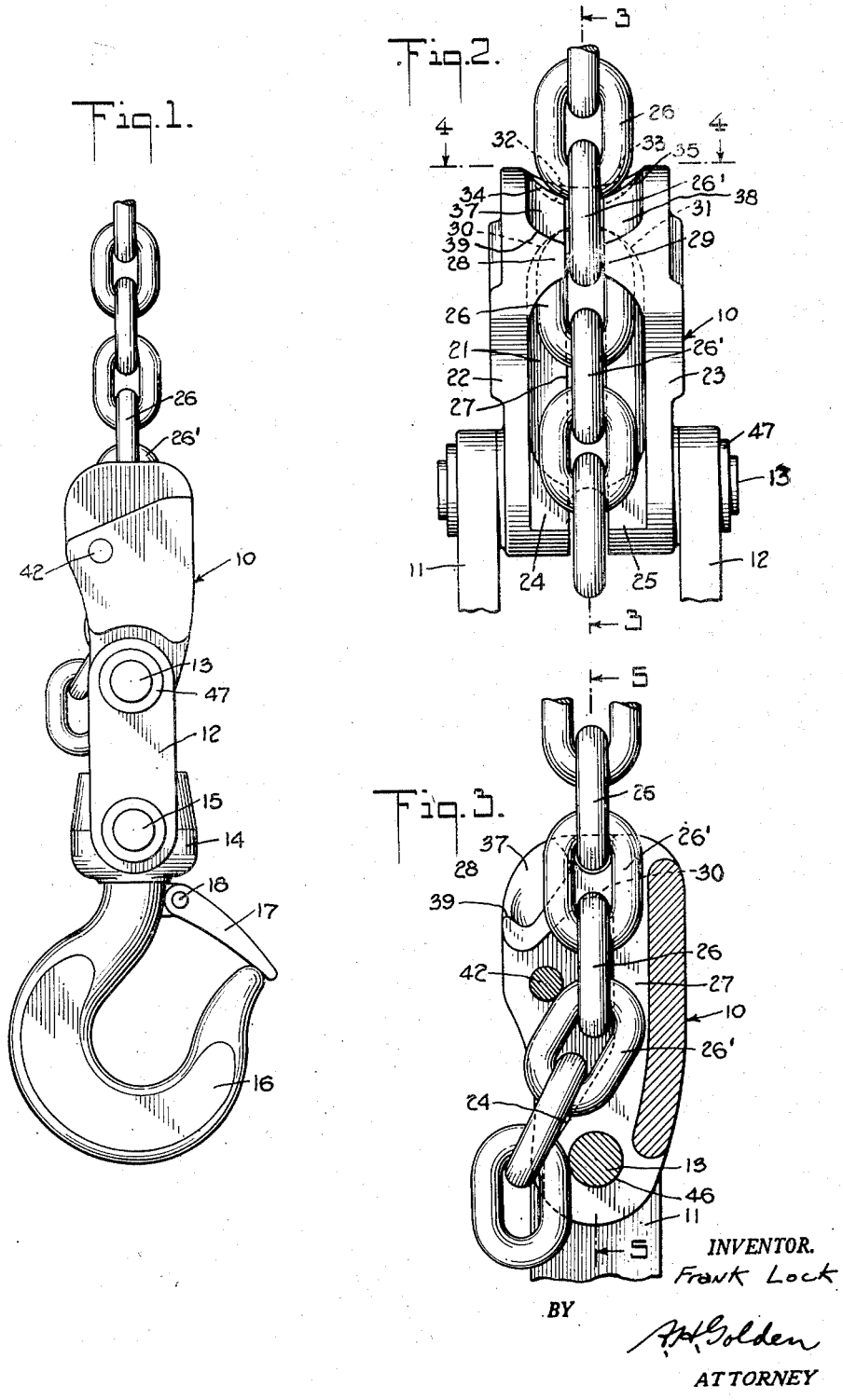

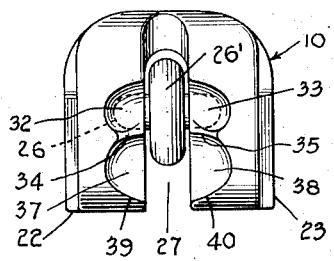
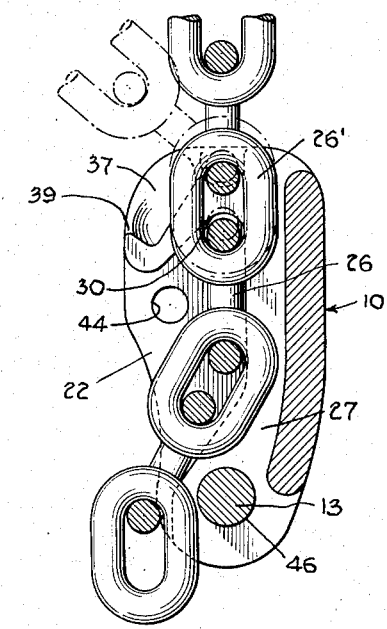
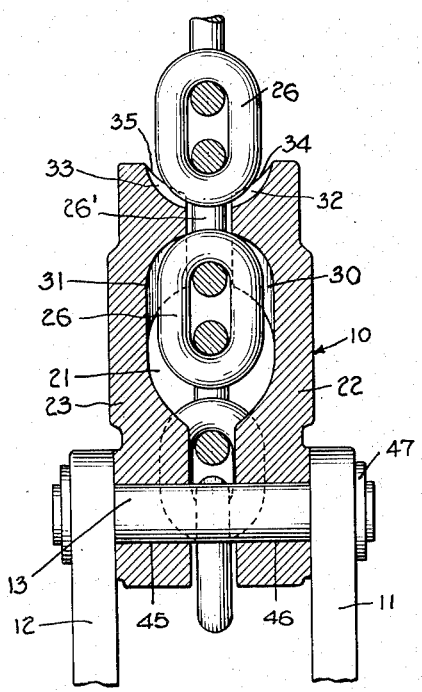
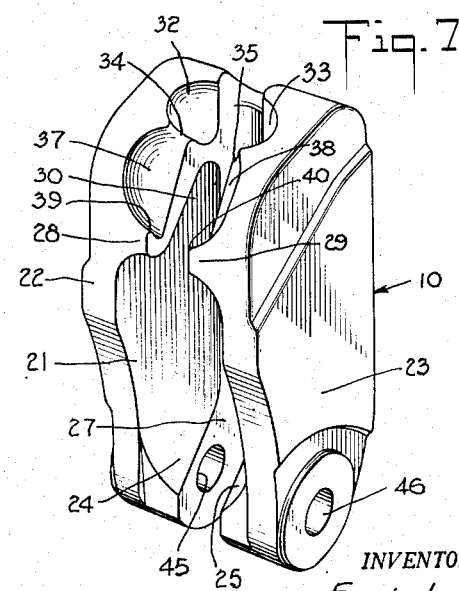

2,630,610

UNITED STATES PATENT OFFICE 2,630,610

CHAIN-BLOCK CONNECTION

Frank Lock, Philadelphia, Pa., assignor to The Yale & Towne Manufacturing Company, Stamford, Conn., a corporation of Connecticut Application October 18, 1949, Serial No. 122,047

1 Claim. (Cl. 24—116)

This invention relates to a quick detachable chain coupling device and particularly to a detachable chain coupling member forming a part of a swivel hoist hook assembly and adapted to releasably connect the assembly to chain links of a free and flexible chain.

Heretofore, the connection of coupling members with links of a flexible chain has been a difficult operation and required the use of pins or the like parts which are detachable from the coupling member and indispensable to the effecting of the connection of the chain with the coupling member. The connection of the chain with the coupling member could not be made unless the pin or like part was used. Such pins often become lost unless a small chain was used for securing the pin to the coupling member. Such small chain has been vulnerable to rough treatment and soon became disconnected and the pin again made a separable part which was easily lost.

A further disadvantage of prior coupling devices has been that the coupling pin has assumed the load. This pin has been passed through a chain link and has been subjected to considerable wear and has soon become weakened and bent making impossible the removal of the pin and its easy insertion. Not only has the pin received considerable wear, but the chain link through which the pin passes has received wear and become thin so that the chain has become weakened in places which could not be readily detected without careful inspection. One might take to a distant location a chain which from all appearances would look to be in good condition, but yet had become weakened because of one of these links having been worn by a connecting pin and thus find upon applying the chain to use at this distant location that he had a chain needing considerable repair and finding himself without tools for conveniently effecting the repair of the chain.

It is accordingly among the principal objects of the present invention to provide a chain coupling device which can be attached to the chain at any location on the chain and does not require the use of a through pin for the fixing of the device to the chain and wherein the load through the coupling device is assumed upon the end of a chain link by inwardly extending formations within a pocket receiving the chain links and wherein upon making the attachment the chain link is required to follow a bayonet slot-like path through the coupling device and wherein the coupled connection with the chain will be positively maintained by the locking of an upper link on the top of the device and so long as the chain and coupling device are maintained in a particular normal relation that cannot be disturbed except by predetermined manipulation of the parts.

It is another object to provide a quick detachable chain coupling device for the connection of a swivel hoist hook assembly to derrick or hoist chains formed of metal forged chain links.

Other objects of the present invention are to provide a quick detachable chain coupling device which is of simple construction, inexpensive to manufacture, formed of a single member of block-like configuration adapted to assume the load, of small dimension and easy to handle, which permits the easy manipulation of the chain therewithin, is adapted for use as a part of a swivel hoist hook assembly and is efficient in operation.

In accordance with the invention, there is provided a single block-like member having a pocket opening extending from one side thereof to receive the links of a chain by the sidewise thrust of such links thereinto. The opposite sides of the pocket have inwardly extending formations providing upward inclined or bayonet slots for receiving respectively the opposite shoulders or rounded end of a flatwise presented chain link. The top of a member is recessed to receive and retain the link of the chain lying immediately above the member to lock the chain in the member. This upper chain link is angled upwardly and rearwardly when under links are located in the pocket opening and when effecting the locking engagement of the chain with the member. The edgewise presented links are received and retained in a vertically extending space at the back of the pocket opening. Below the top opening and on the top of the inwardly extending formations is a safety or secondary recess into which the upper link is dropped without immediate disengagement of the other links until the member is inverted to spill the other links from the member and from the pocket openings. This secondary recess will temporarily retain the chain links upon the member while fitting the under link into the bayonet slots. No pin is necessary for the connection of the chain links to the member. The entire strain is taken through the member and through the inward extending formations of the pocket opening forming the bayonet slots. The arrangement is such that any set of links along the length of the chain can be used for the attachment of the coupling member. The coupling member is not dependent upon a free link for receiving a pin to effect a connection of the coupling member with the chain. The coupling device is accordingly adjustable upon the chain when it is desired to use a greater or less amount of effective length of the chain. A pin may be extended through the member merely to hold the chain links within the chain pocket and to prevent the links from spilling out of the pocket, but in no sense to assume any of the load taken by the chain coupling device.

There has been set forth rather broadly the more important features of this invention in order that the detailed description thereof that follows may be better understood and in order that the contribution to the art may be better appreciated. There are, of course, additional features to the invention that will be described hereinafter and which will form also subject matter of the claim appended hereto. Those skilled in the art will appreciate that the conception on which the disclosure is based may be readily utilized as a basis for the designing of other structures for the carrying out of the several purposes of the invention. It is important, therefore, that a claim be granted upon this invention which shall be of such breadth to prevent the appropriation of the invention by those skilled in the art.

In the drawings:

Fig. 1 is a side elevational view of the quick detachable chain coupling device forming a part of a swivel hoist hook assembly and serving to connect the assembly with chain links.

Fig. 2 is an enlarged front elevational view of the chain coupling device and of the chain in place therein.

Fig. 3 is a vertical sectional view of the chain coupling device taken generally on line 3—3 of Fig. 2 and looking in the direction of the arrows thereof.

Fig. 4 is a top plan view of the chain coupling device taken generally on line 4—4 of Fig. 2 and looking in the direction of the arrows thereof.

Fig. 5 is a vertical sectional view of the coupling device taken generally on line 5—5 of Fig. 3 and looking in the direction of the arrows thereof.

Fig. 6 is a sectional view similar to Fig. 3, but with the section being taken also through the chain links.

Fig. 7 is a front perspective view of the chain connecting device free of the chain and of the swivel hook connecting side links.

Referring now to the figures, 10 represents generally the quick detachable chain coupling device embodying the features of the present invention and forming in the present instance a part of a swivel hoist hook assembly which further includes side links 11 and 12 connected to the lower end of the coupling device 10, a transverse pin 13 for connecting the links to the device, a swivel hook support 14 connected by trunnion projections 15 with the lower ends of side links 11 and 12, Fig. 1, and a flat sided hoist hook 16 depending from the support. Over the end of the hook there extends a cover 17 which can be lifted to provide access to the hook opening. This cover 17 is hinged to the shank of the hook as indicated at 18. While the chain coupling device 10 herein forms a part of the swivel hook assembly, it shall be understood that this coupling device can have other applications and form a part of other assemblies needing a quick detachable connection with a link chain. The features of the invention are found principally in the coupling device 10 and these features are to be now specifically set forth in the description that follows.

The chain coupling device 10 is essentially a single member, a metal casting or forging, in which is provided a chain receiving pocket 21 extending inwardly from the front face of the member and with parallel side portions 22 and 23 providing the side walls of the pocket opening. In the bottom of the opening and on the side walls of the side portions are inwardly and upwardly inclined guide formations 24 and 25 for directing a flatwise presented chain link 26 placed in the pocket 21 inwardly and upwardly. Between the guide formations 24 and 25 is a vertically-extending space 27 for receiving edgewise presented chain links 26' which enter the pocket along with the flatwise presented links 26. The side portions 22 and 23 also have laterally-extending formations 28 and 29 respectively which are so shaped and curved on their under faces as to provide along with the guide formations 24 and 25, respectively, opposing bayonet slots 30 and 31 adapted to receive and direct the upper end of the flatwise presented chain link 26 and to cause, as the chain is lifted from the top of the device, the chain link 26 to be moved inwardly and upwardly under the formations 28 and 29 and shouldered thereagainst upon reaching the upper ends of the bayonet slots in the side portions. Accordingly, the chain link 26 will be locked against outward displacement within the pocket opening of the device 10 and edgewise presented links 26' will lie within the vertically-extending space or slot 27 provided between the inclined guide formations 24 and 25.

In order that an upper flatwise presented chain link 26 can be caught and retained within the pocket opening 21, its lower end is dropped into opposing side pockets 32 and 33 of the respective laterally-extending formations 28 and 29. These inwardly extending formations are of such shape and vertical thickness as to allow sufficient freedom of the chain links so that the bottom portion of the upper flatwise presented link 26 can be elevated thereover. Raised ledges 34 and 35 are provided in front of the top opposing side pockets 32 and 33 in the top of the device to perfect the locking function of these pockets.

Upon the upper flatwise presented link 26 being released from the pockets 32 and 33 and extended forwardly over the ledges 34 and 35, the rounded lower end of the same will be caught in opposing downwardly inclined safety or secondary pockets 37 and 38 and retained therein temporarily by lower upturned edges 39 and 40 thereof pending the dropping of the lower flatwise link 26 from the bayonet slots 30 and 31. By inverting the device, the links 26 and 26' can be spilled out of the pocket opening 21 and the upper flatwise link 26 relieved from the lower upturned edges 39 and 40 of the downwardly inclined secondary recesses 37 and 38.

To return the chain to the coupling device, the lower chain link is first placed in the pocket opening 21 loosely and such that the flatwise presented link 26 has its upper end entering the bayonet slots 30 and 31, the edgewise presented links 26' lying in the vertical space or slot 27 and the upper flatwise presented link 26 extended first into pockets 37 and 38 and then lifted upwardly over the ledges 34 and 35 into its final position in the top pockets 32 and 33 and the lower flatwise presented chain link 26 in the upper ends of the bayonet slots 30 and 31. The chain will then lie true within the pocket opening 21 and through the axial center of the coupling device so long as tension is retained upon the chain and the device kept in a raised and vertical manner, there is no opportunity for the chain links to be relieved from the device. In order to keep the chain links lying within the pocket opening 21 from spilling out of the same, as should slack be allowed in the chain and it be accidentally manipulated, a transverse retaining pin 42 may be passed through openings 44 in the side wall portions 22 and 23 and held therein by a washer and a cotter pin. This pin is not passed through any one of the chain links and does not assume any of the load taken by the device. Actually the pin 42 is not necessary and is not shown in Fig. 7.

The lower ends of the side portions have respectively openings 45 and 46 for receiving the pin 13 which connects the links 11 and 12, supporting the swivel hook parts, in place upon the coupling device. The pin 13 can be held in place at its opposite ends by upsetting the ends of pins over washers 47.

While this coupling device has been illustrated as forming a part of a swivel hook assembly, it can be easily seen that the coupling device can be differently formed for use with other assemblies. It can also be formed to couple two chain sections, as by the opposite end of the device being provided with formations similar to those above described and adapted to detachably receive another chain link section.

It shall be further seen that since a pin is not necessary for the attachment of a chain link with the coupling device that wear on pins and chain links is not a problem and that the problem of removing a distorted pin or replacing one, or the loss of such a pin, does not have to be faced.

It should be further apparent that there has been provided a quick detachable chain coupling device which can be connected to the chain at any point therealong and easily adjusted upon the chain from one point to another.

While various changes may be made in the detail construction, it shall be understood that such changes shall be within the spirit and scope of the present invention as defined by the appended claim.

I claim:

A detachable chain coupling device comprising a member having integrally connected side walls forming a pocket opening adapted to receive chain links, said side walls having at their upper ends opposing laterally extended formations serving to provide between them a narrow bayonet slot for receiving and retaining in shouldered engagement with said formation the upper end portion of a chain link presented flatwise in said pocket opening, said opposing laterally extended formations having opposing top pockets on their upper surfaces adapted to receive between them an upper flatwise presented chain link, said laterally-extending formations permitting the elevation of the upper flatwise presented chain link upwardly thereover for engagement with the top pockets whereby to lock the chain upon the coupling device, said opposing laterally-extending formations having downwardly inclined portions extending from the opposing top pockets for temporarily receiving and guiding the upper flatwise presented chain link while establishing the connection of the first mentioned flatwise presented chain link within the bayonet slot between the side portions, and said downwardly inclined portions having each a lip at its lower end to form a retaining secondary pocket for said upper flatwise presented link when said link is applied thereto.

FRANK LOCK.

REFERENCES CITED

The following references are of record in the file of this patent:

UNITED STATES PATENTS

| Number | Name | Date |
| --- | --- | --- |
| 963,095 | Sylvester | July 5, 1910 |
| 1,179,951 | Moore | Apr. 18, 1916 |
| 1,470,481 | Popps | Oct. 9, 1923 |
| 1,709,244 | Abbe | Apr. 16, 1929 |
| 2,179,564 | Smith | Nov. 14, 1939 |
| 2,448,482 | Woolslayer et al. | Aug. 31, 1948 |